United States Patent
Tian et al.

(10) Patent No.: US 7,860,402 B2
(45) Date of Patent: Dec. 28, 2010

(54) MODULATING A SIGNAL ACCORDING TO $2^n$-PSK MODULATION

(75) Inventors: Cechan Tian, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1007 days.

(21) Appl. No.: 11/627,401

(22) Filed: Jan. 26, 2007

(65) Prior Publication Data

US 2008/0181618 A1    Jul. 31, 2008

(51) Int. Cl.
H04L 27/20    (2006.01)

(52) U.S. Cl. .................. 398/188; 398/182; 398/183; 398/187

(58) Field of Classification Search .................. 398/188
See application file for complete search history.

(56) References Cited

U.S. PATENT DOCUMENTS

| | | | | |
|---|---|---|---|---|
| 4,959,826 | A * | 9/1990 | Smith | 398/90 |
| 5,101,450 | A * | 3/1992 | Olshansky | 385/3 |
| 5,222,103 | A * | 6/1993 | Gross | 375/281 |
| 5,305,412 | A * | 4/1994 | Paoli | 385/122 |
| 6,271,950 | B1 * | 8/2001 | Hansen et al. | 398/154 |
| 6,539,131 | B1 * | 3/2003 | Gill et al. | 385/3 |
| 6,798,557 | B1 * | 9/2004 | Leven | 359/279 |
| 7,433,604 | B1 * | 10/2008 | Kim et al. | 398/188 |
| 2003/0058504 | A1 * | 3/2003 | Cho et al. | 359/161 |
| 2004/0028418 | A1 * | 2/2004 | Kaplan et al. | 398/188 |
| 2004/0141222 | A1 * | 7/2004 | Miyazaki et al. | 359/237 |
| 2005/0068887 | A1 * | 3/2005 | Chen et al. | 370/215 |
| 2006/0171722 | A1 * | 8/2006 | Toliver | 398/188 |
| 2007/0047969 | A1 * | 3/2007 | Nakashima et al. | 398/198 |
| 2007/0177882 | A1 * | 8/2007 | Akiyama | 398/185 |
| 2007/0212079 | A1 * | 9/2007 | Ooi et al. | 398/198 |
| 2007/0274731 | A1 * | 11/2007 | Boffi et al. | 398/188 |
| 2008/0074722 | A1 * | 3/2008 | Kang | 359/240 |
| 2008/0165900 | A1 * | 7/2008 | Vassilieva | 375/329 |
| 2008/0239448 | A1 * | 10/2008 | Tanaka et al. | 359/245 |
| 2009/0047028 | A1 * | 2/2009 | Terahara et al. | 398/188 |
| 2009/0245795 | A1 * | 10/2009 | Joyner et al. | 398/79 |
| 2009/0257755 | A1 * | 10/2009 | Buelow | 398/184 |
| 2009/0324247 | A1 * | 12/2009 | Kikuchi | 398/159 |
| 2010/0067902 | A1 * | 3/2010 | Sun et al. | 398/25 |
| 2010/0098435 | A1 * | 4/2010 | Akiyama | 398/188 |

OTHER PUBLICATIONS

Phase modulator. (1992). In Academic Press Dictionary of Science and Technology. Retrieved from http://www.credoreference.com/entry/apdst/phase_modulator.*

(Continued)

Primary Examiner—Ken N Vanderpuye
Assistant Examiner—Tanya Ngo
(74) Attorney, Agent, or Firm—Baker Botts L.L.P.

(57) ABSTRACT

A system operable to modulate a signal according to phase-shift keying (PSK) modulation includes a translator and a phase modulation system. The translator receives data signals and translates the data signals into control signals, where the number of control signals is greater than the number of data signals. The phase modulation system includes phase modulators. Each phase modulator receives a control signal and PSK modulates a communication signal according to the control signal.

20 Claims, 5 Drawing Sheets

OTHER PUBLICATIONS

Ohm, Michael, et al., "*Differential Optical 8-PSK with Direct Detection (8-DPSK/DD)*", 4. ITG-Fachtagung, Leipzig, Mai 2003, Seite 177-181, 5 pages, 2003.

Kim, Cheolhwan, et al., "*Direct-detection optical differential 8-level phase-shift keying (OD8PSK) for spectrally efficient transmission*", Optics Express, vol. 12, No. 15, pp. 3415-3421, Jul. 26, 2004.

Kim, Cheolhwan, et al., "*WDM Transmission over 320 km EDFA-Amplified SSMF Using 30 Gb/s Return-to-Zero Optical Differential 8-Level Phase-Shift Keying (OD8PSK)*", Optics Express, vol. 13, No. 11, pp. 4044-4049. May 30, 2005.

\* cited by examiner

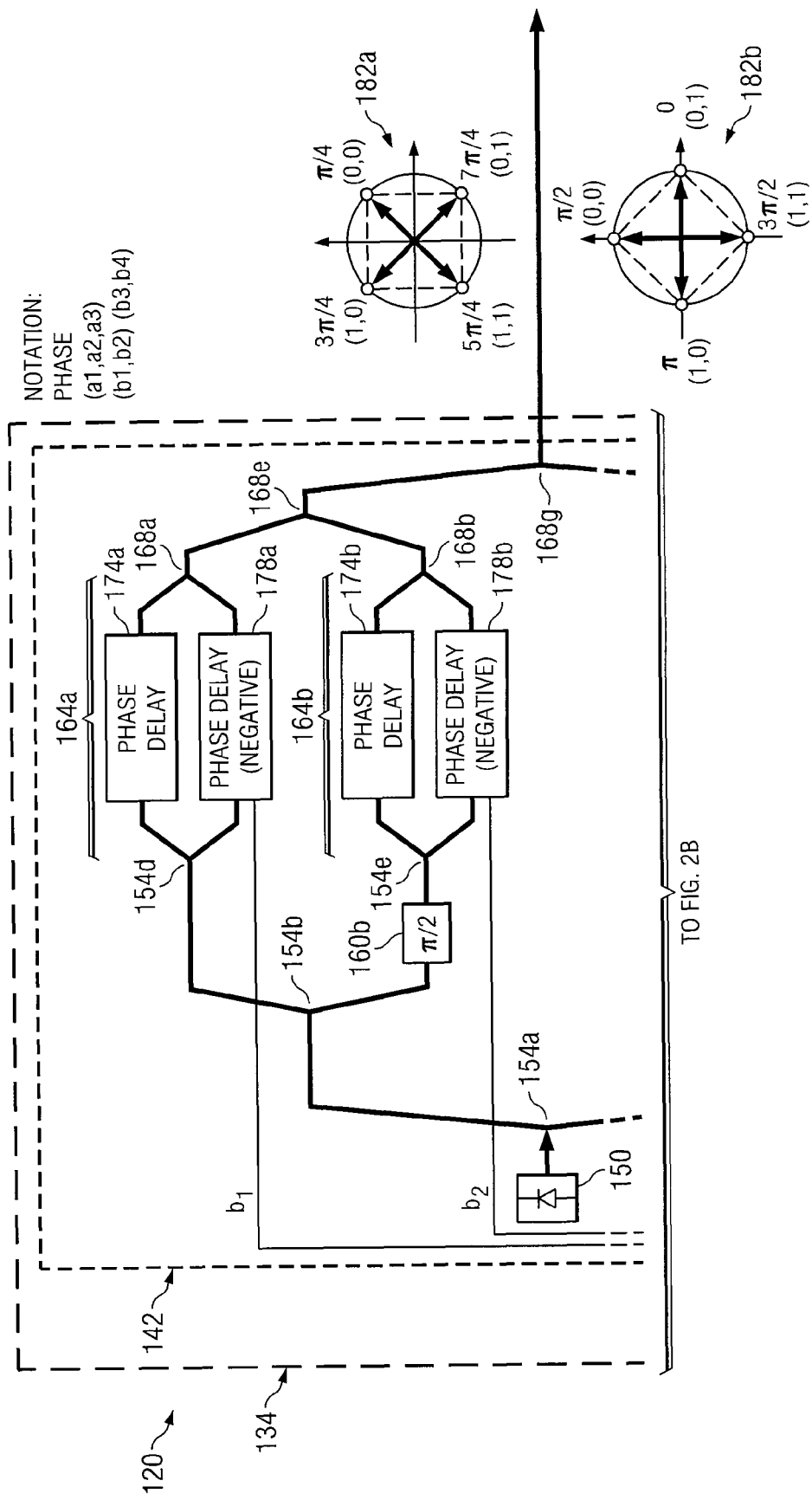

MODULATING A SIGNAL ACCORDING TO $2^n$-PSK MODULATION

TECHNICAL FIELD

This invention relates generally to the field of signal communication and more specifically to modulating a signal according to $2^n$-PSK modulation.

BACKGROUND

Signals may be modulated using phase-shift keying (PSK). In PSK modulation, changes in the phase of a signal are used to represent data. In multi-level PSK modulation, multiple bits may be transmitted per symbol, which allows for more data to be transmitted at a lower symbol rate. For example, 4-PSK modulation can transmit two bits per symbol, 8-PSK modulation can transmit three bits per symbol, and 16-PSK modulation can transmit four bits per symbol.

Multi-level PSK communication may impose particular requirements on a communication system. For example, multi-level PSK communication may be improved by communicating signals with purer phases. In general, a signal with a purer phase has shorter rise and fall times, and a signal with a pure phase may have essentially no rise or fall time. Known systems for modulating the signals, however, may not yield signals with satisfactorily pure phases.

SUMMARY OF THE DISCLOSURE

In accordance with the present invention, disadvantages and problems associated with previous techniques for modulating a signal according to $2^n$-PSK modulation may be reduced or eliminated.

According to one embodiment of the present invention, a system operable to modulate a signal according to phase-shift keying (PSK) modulation includes a translator and a phase modulation system. The translator receives data signals and translates the data signals into control signals, where the number of control signals is greater than the number of data signals. The phase modulation system includes phase modulators. Each phase modulator receives a control signal and PSK modulates a communication signal according to the control signal.

Certain embodiments of the invention may provide one or more technical advantages. A technical advantage of one embodiment may be that a transmitter includes two-arm phase modulators that may yield a signal with purer phases. A translator may convert a number of data signals into a number of control signals suitable for the phase modulators.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
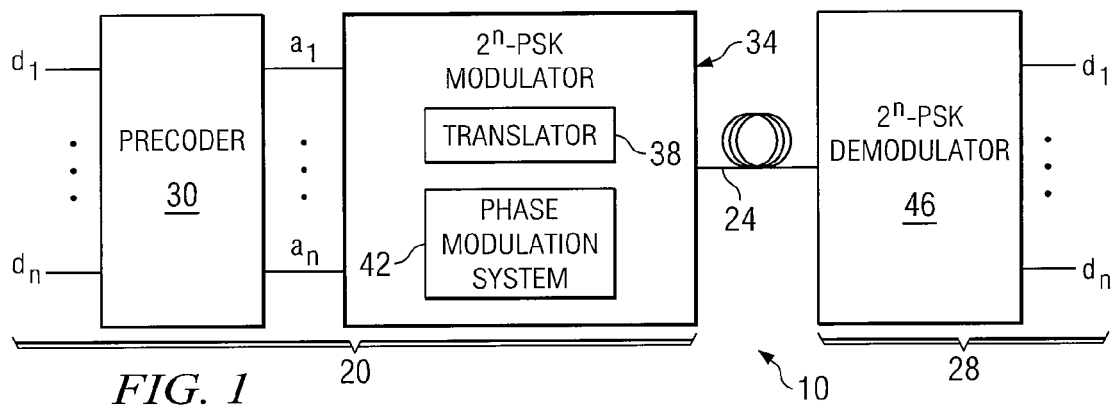
FIG. 1 illustrates one embodiment of a system for communicating a signal according to phase-shift keying (PSK) modulation.

FIG. 1 illustrates one embodiment of a system 10 for communicating a signal according to phase-shift keying (PSK) modulation. In the embodiment, a transmitter of system 10 may include two-arm phase modulators that may yield a signal with satisfactorily pure phases. The transmitter may include a translator that converts a particular number of data signals into a number of control signals suitable for the number of phase modulators.

According to one embodiment, system 10 communicates signals. A signal may refer to an optical signal transmitted as light pulses. An optical signal may have a frequency of approximately 1550 nanometers, and a data rate of, for example, 10, 20, 40, or over 40 gigabits per second. A signal may communicate any suitable information such as voice, data, audio, video, multimedia, other information, or any combination of the preceding.

According to the illustrated embodiment, system 10 includes a transmitter 20 coupled to a receiver 28 by a link 24. According to the embodiment, transmitter 20 modulates a signal according to PSK modulation to encode data into the signal. Transmitter 2 sends the signal to receiver 28 through link 24. Receiver 28 demodulates the signal according to PSK demodulation to retrieve the data encoded in the signal.

According to one embodiment, PSK modulation may refer to differential PSK (DPSK) modulation. In DPSK modulation, phase shifts between successive symbols represent bits. According to n-phase-shift keying (n-PSK) modulation, n different phase shifts may be used to encode p bits per symbol, where $n=2^p$. For example, differential binary PSK (DBPSK) uses two phase shifts to encode one bit per symbol, and differential quadrature PSK (DQPSK) uses four phase shifts to encode two bits per symbol.

According to the illustrated embodiment, transmitter 20 includes a precoder 30 and a $2^P$-PSK modulator 34 coupled as shown. Precoder 30 precodes data $d_i$ to yield data signal $a_i$ that represents data $d_i$. Precoding may involve combining data $d_i$ and data signal $a_i$ such that the signals at receiver 28 may be restored after demodulation. Precoder 30 may comprise logic gates, such as OR, AND, XOR, delay, and/or other logic gates.

$2^P$-PSK modulator 34 modulates a signal according to $2^P$-PSK modulation to encode data $d_i$ into a signal. PSK modulator 34 may include a translator 38 and a phase modulation system 42. Translator 38 translates data signals $a_i$ into control signals that control modulation to encode data $d_i$.

According to one embodiment, a control signal may control modulation for a particular phase modulator of phase modulation system 42. In the embodiment, the number of phase modulators may be greater than the number of data signals, so the number of control signals may be greater than the number of data signals. For example, the number of data signals may be p, and the number of control signals may be $2^P/2$. Accordingly, translator 38 may convert the number of data signals into the number of control signals suitable for the number of phase modulators.

Phase modulation system 42 modulates communication signals according to the control signals $a_i$ to encode data $d_i$ into the communication signals, which are then combined for transmission. Phase modulation system 42 may include phase modulators, each of which may modulate a communication signal according to a control signal. Each phase modulator may encode at a different pair of phases than that used by the other phase modulators, thus yielding encoding at different phases.

Link 24 communicates a signal from transmitter 20 to receiver 28. Link 24 may comprise any suitable link operable to communicate the signal, for example, link 24 may comprise optical fiber operable to transmit an optical signal.

Receiver 28 demodulates the signal received from transmitter 20. According to the illustrated embodiment, receiver 28 may include a PSK demodulator 46. PSK demodulator 46 demodulates a signal according to PSK demodulation to retrieve data $d_i$ communicated by the received signal.

Components of system 10 may comprise logic, an interface, a memory, or any suitable combination of the preceding. Logic may refer to hardware, software, other logic, or any suitable combination of the preceding. Certain logic may manage the operation of a device, and may comprise, for example, a processor. An interface may receive input, send output, perform suitable processing of the input or output or both, or any combination of the preceding, and may comprise one or more ports, conversion software, or both. A memory may store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Modifications, additions, or omissions may be made to system 10 without departing from the scope of the invention. The components system 10 may be integrated or separated according to particular needs. Moreover, the operations of system 10 may be performed by more, fewer, or other components. Additionally, operations of system 10 may be performed using any suitable logic. As used in this document, "each" refers to each member of a set or each member of a subset of a set.

Figure 2B:
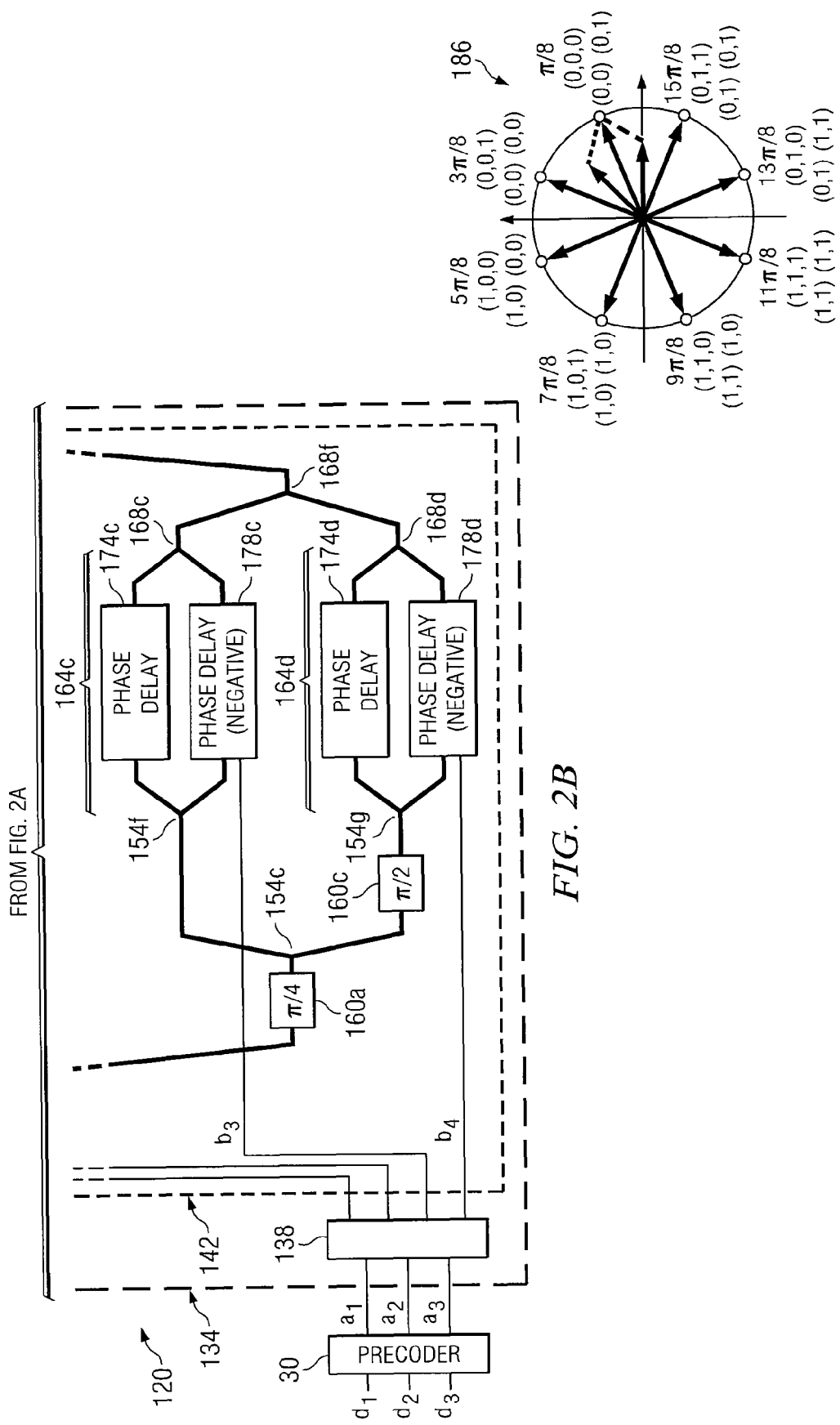
FIG. 2 illustrates an example of an 8-PSK transmitter.

FIG. 2 illustrates an example of an 8-PSK transmitter 120 that communicates a signal according to 8-PSK modulation. According to the illustrated embodiment, transmitter 120 may include a precoder 30 coupled to an 8-PSK modulator 134. Precoder 30 precodes data $d_i$ to yield data signals $a_i$ that represent data $d_i$, where i=1, 2, and 3. Precoder 30 may operate as described with reference to FIG. 1.

Eight-PSK modulator 134 modulates a signal according to 8-PSK modulation. According to the illustrated embodiment, 8-PSK modulator 134 may include a translator 138 and a phase modulation system 142. Translator 138 translates the data signals $a_i$ into control signals $b_k$, where k=1, 2, . . . , 4. Translator 138 may use any suitable function to translate the signals. According to one embodiment, translator 138 may use the following function:

$b_1 = a_1$
$b_2 = a_2$
$b_3 = a_2 a_3' + a_1 a_3$
$b_4 = a_1' a_3' + a_2 a_3$

Phase modulation system 142 modulates communication signals in accordance with control signals $b_k$ received from translator 138. Phase modulation system 142 may comprise any suitable components operable to modulate a system according to 8-PSK modulation. According to the illustrated embodiment, phase modulation system 142 includes a light source 150, splitters 154, phase shifters 160, phase modulators 164, and couplers 168 coupled as shown.

Light source 150 generates a signal that may yield communication signals that can be encoded with data $d_i$. According to one embodiment, light source 150 may emit a continuous wave light beam that may be split into one or more communication signals.

Splitters 154 split signals to yield n communication signals for the n-PSK modulation. In the illustrated embodiment, splitters 154a-g split signals to yield eight communication signals for 8-PSK modulation.

Phase shifters 160 shift the phases of at least a subset of the communication signals to yield communication signals of different phases for the different phase modulators 164. In one embodiment, a particular phase modulator 164 receives a signal of a particular phase. In the illustrated embodiment, phase shifters 160a-c shift the phases of three signals to yield four signals with different phases.

Phase modulators 164 modulate communication signals according to control signals $b_k$ to encode data $d_i$ communicated by control signals $b_k$. A phase modulator 164 may comprise a two-arm phase modulator, for example, a Mach-Zehnder modulator, that may yield a signal with a substantially pure phase.

Phase modulator 164 may modulate a first signal at a first phase and may modulate a second signal at a second phase. In one example, the difference between the first and second phases may be substantially $\pi$. According to the illustrated embodiment, a phase modulator 164 may comprise a phase delay 174 and a negative phase delay 178. Phase delay 174 modulates a first communication signal by delaying a first phase. Negative phase delay 178 modulates a second communication signal by delaying a second phase that is substantially the negative of the first phase.

Couplers 168 couple the encoded communication signals for transmission to receiver 28. In the illustrated embodiment, couplers 168a-g couple the signals from phase modulators 164. The signal resulting from coupler 168g is transmitted to receiver 28.

In the illustrated embodiment, phase modulators 164a-b may modulate at phases indicated by diagram 182a, and phase modulators 164c-d may modulate at phases indicated by diagram 182b. Diagram 186 illustrates the phases $q\pi/8$, where q=0, 1, 2, . . . , 7, modulated in the resulting signal. According to diagram 186, data from data signals $(a_1, a_2, a_3)$ are encoded by control signals $(b_1, b_2)$ $(b_3, b_4)$ at a particular phase.

Modifications, additions, or omissions may be made to transmitter 120 without departing from the scope of the invention. The components transmitter 120 may be integrated or separated according to particular needs. Moreover, the operations of transmitter 120 may be performed by more, fewer, or other components. Additionally, operations of transmitter 120 may be performed using any suitable logic.

Figure 3A:
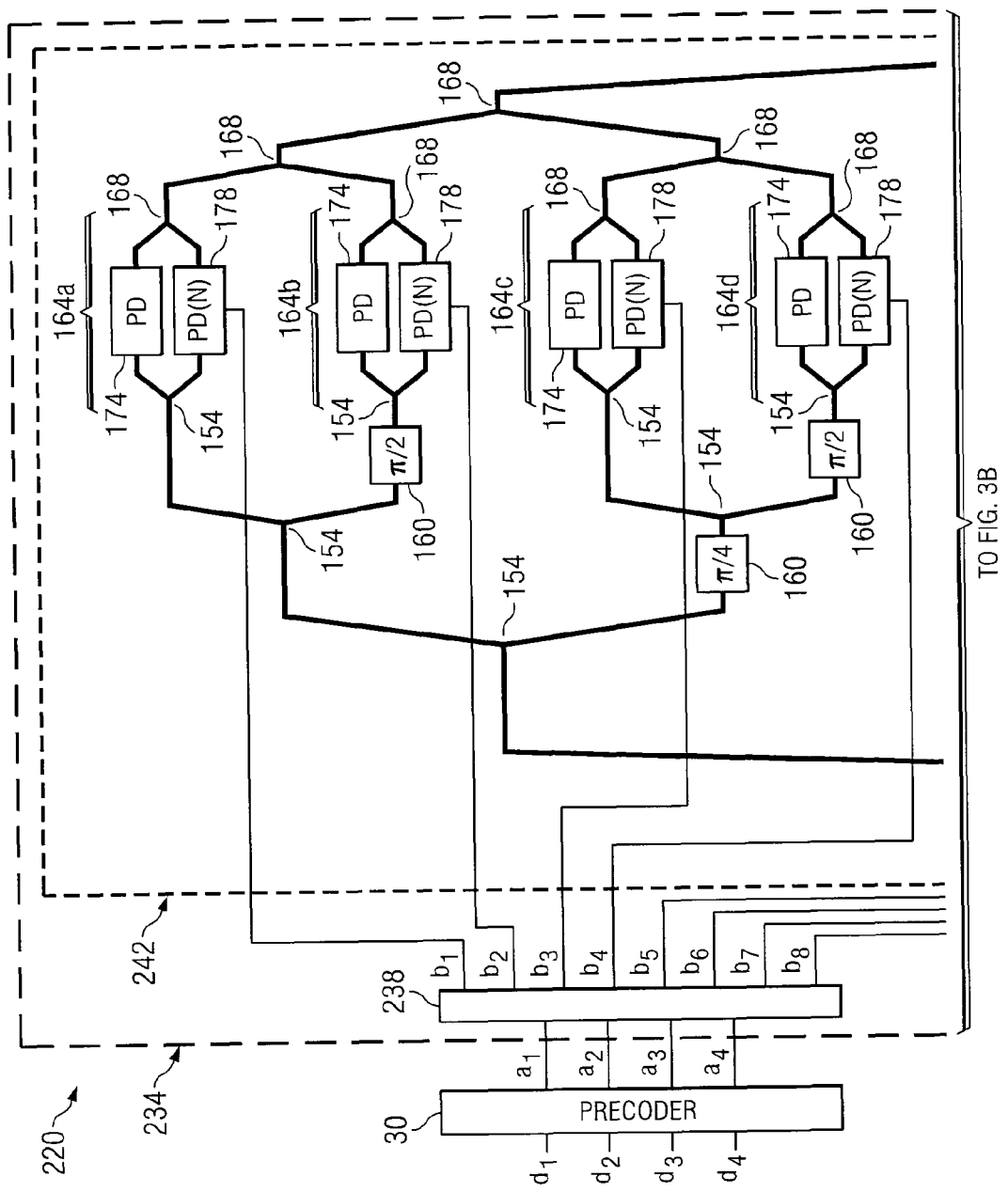
FIG. 3 illustrates an example of a 16-PSK transmitter.
Figure 3B:
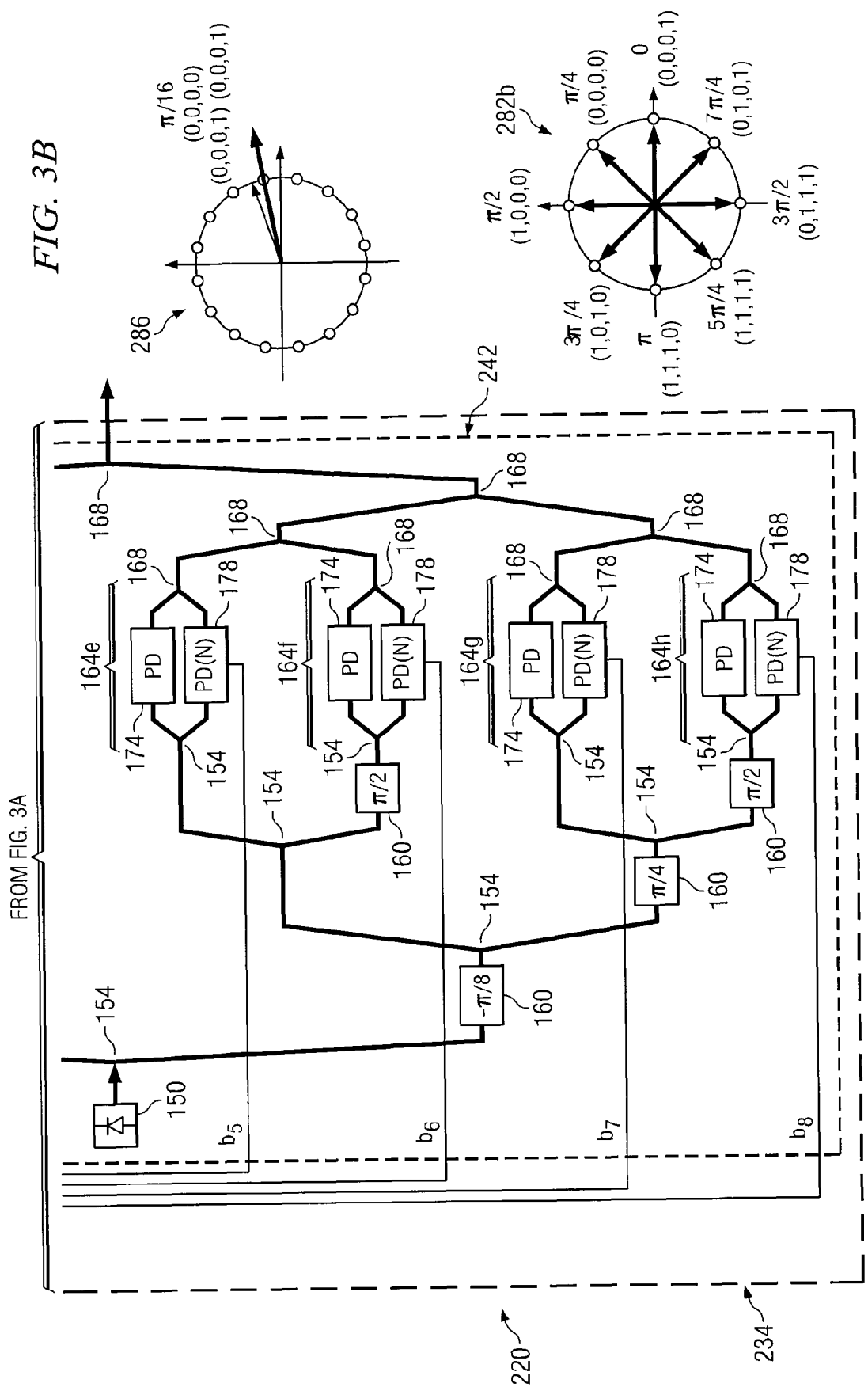

FIG. 3 illustrates an example of a 16-PSK transmitter 220 that communicates a signal according to 16-PSK modulation. According to the illustrated embodiment, transmitter 220 may include a precoder 30 coupled to a 16-PSK modulator 234. Precoder 30 precodes data $d_i$ to yield data signals $a_i$ that represent data $d_i$, where i=1, 2, and 3. Precoder 30 may operate as described with reference to FIG. 1.

Eight-PSK modulator 234 modulates a signal according to 16-PSK modulation. According to the illustrated embodiment, 16-PSK modulator 234 may include a translator 238 and a phase modulation system 242. Translator 238 translates the data signals $a_i$ into control signals $b_k$, where k=1, 2, . . . , 8. Translator 238 may use any suitable function to translate the signals. According to one embodiment, translator 238 may use the following function:

$b_1 = a_1$
$b_2 = a_2$
$b_3 = a_2 a_3' + a_1 a_3$
$b_4 = a_1' a_3' + a_2 a_3$
$b_5 = a_2' a_3 a_4 + a_1 (a_3' + a_4')$
$b_6 = a_1 a_3 a_4 + a_2 (a_3' + a_4')$
$b_7 = a_2 a_3' a_4' + a_1 (a_3 + a_4)$
$b_8 = a_1' a_3' a_4' + a_2 (a_3 + a_4)$

Phase modulation system 242 modulates communication signals in accordance with control signals $b_k$ received from translator 238. Phase modulation system 242 may comprise any suitable components operable to modulate a system according to 16-PSK modulation. According to the illustrated embodiment, phase modulation system 242 includes a light source 150, splitters 154, phase shifters 160, phase modulators 164, and couplers 168 coupled as shown. Light source 150, splitters 154, phase shifters 160, phase modulators 164, and couplers 168 may operate as described with reference to FIG. 2, but for 16-PSK modulation instead of 8-PSK modulation.

In the illustrated embodiment, phase modulators 164a-d may modulate at phases indicated by diagram 282a, and phase modulators 164e-h may modulate at phases indicated by diagram 282b. Diagram 286 illustrates the phases $q\pi/16$, where $q=0, 1, 2, \ldots, 15$, modulated in the resulting signal. According to diagram 286, data from data signals $(a_1, a_2, a_3, a_4)$ are encoded by control signals $(b_1, b_2, b_3, b_4)$ $(b_5, b_6, b_7, b_8)$ at a particular phase.

Modifications, additions, or omissions may be made to transmitter 220 without departing from the scope of the invention. The components transmitter 220 may be integrated or separated according to particular needs. Moreover, the operations of transmitter 220 may be performed by more, fewer, or other components. Additionally, operations of transmitter 220 may be performed using any suitable logic.

Figure 4:
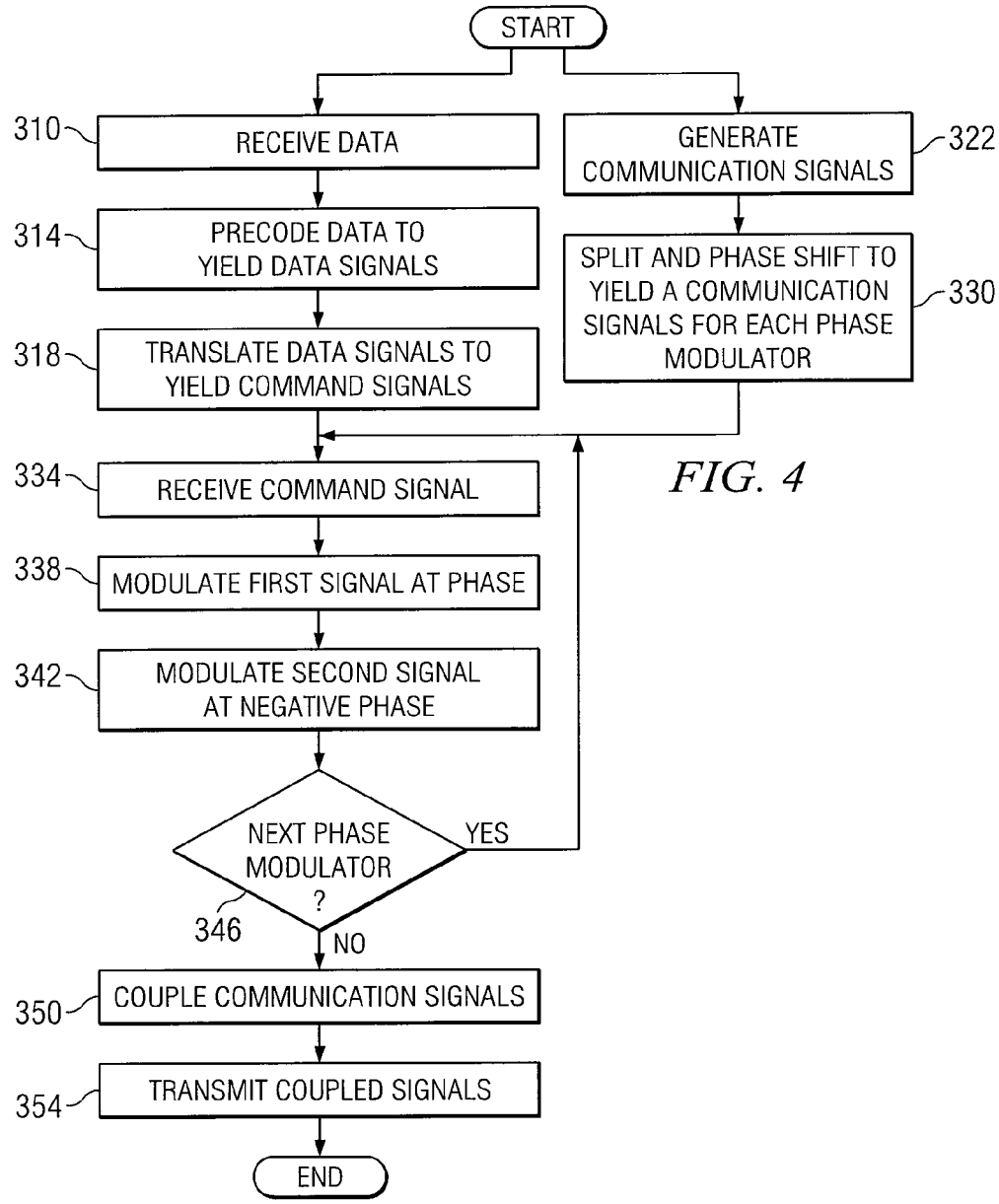
FIG. 4 illustrates one embodiment of a method for communicating a signal according to PSK modulation.

FIG. 4 illustrates one embodiment of a method for communicating a signal according to PSK modulation. The method may be performed by transmitter 120 of FIG. 2 or transmitter 220 of FIG. 3.

Steps 310 through 318 are performed by precoder 30 and translator 138, 238 of transmitter 120, 220. Transmitter 20 receives data $d_i$ at step 310. Precoder 30 precodes data $d_i$ to yield data signals $a_i$ at step 314. Translator 138, 238 translates data signals $a_i$ to yield command signals $b_k$ at step 318.

Steps 322 and 330 may be performed by phase modulation system 142, 242 of transmitter 120, 220. Light source 150 of phase modulation system 142, 242 generates a communication signal at step 322. The communication signal is split and phase shifted at step 330 in order to yield a communication signal for each phase modulator 164, where each signal has a different phase. Splitters 154 may split the signals, and phase shifters 160 may shift the signals.

Steps 334 through 346 are performed for each phase modulator 164. A phase modulator 164 receives a command signal $b_k$ at step 334. A phase delay 174 modulates a first communication signal at a first phase according to command signal $b_k$ at step 338. Negative phase delay 178 modulates a second communication signal at the negative phase according to command signal $b_k$ at step 342. If there is a next phase modulator 164 at step 346, the method returns to step 334, where the next phase modulator 164 receives a next command signal. Phase modulators 164 may perform steps 334 through 346 at the same time or at different times.

Couplers 168 couple the modulated communication signals at step 350. The coupled communication signals are transmitted to receiver at step 354. After transmitting the coupled communication signal, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a transmitter includes two-arm phase modulators that may yield a signal with purer phases. A translator may convert a number of data signals into a number of control signals suitable for the phase modulators.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system operable to modulate a signal according to phase-shift keying (PSK) modulation, comprising:
   a translator operable to:
      receive a plurality of data signals; and
      translate the plurality of data signals into a plurality of control signals, the number of control signals greater than the number of data signals; and
   a phase modulation system coupled to the translator and comprising a plurality of phase modulators, wherein each phase modulator comprises a phase delay operable to delay a first phase and a negative phase delay operable to delay a second phase that is substantially the negative of the first phase, each phase modulator operable to:
      receive a control signal of the plurality of control signals; and
      PSK modulate a communication signal of a plurality of communication signals according to the received control signal.

2. The system of claim 1, wherein:
   the number of data signals is p, p being greater than or equal to three; and
   the number of control signals is $2^p/2$.

3. The system of claim 1, wherein each phase modulator modulates at a different pair of phases than the other phase modulators.

4. The system of claim 1, wherein the phase modulation system further comprises:
   a plurality of phase shifters operable to phase shift at least a subset of the plurality of communication signals to yield different phases for the plurality of phase modulators.

5. The system of claim 1, wherein the phase modulation system further comprises:
   a plurality of couplers operable to couple the plurality of modulated communication signals.

6. The system of claim 1, wherein the phase modulation system further comprises:
   a plurality of splitters operable to split one or more optical signals to yield the plurality of communication signals.

7. A method operable to modulate a signal according to phase-shift keying (PSK) modulation, comprising:
   receiving a plurality of data signals;
   translating the plurality of data signals into a plurality of control signals, the number of control signals greater than the number of data signals; and
   repeating the following for each phase modulator of a plurality of phase modulators:

receiving a control signal of the plurality of control signals; and

PSK modulating a communication signal of a plurality of communication signals according to the received control signal by delaying a first phase and delaying a second phase that is substantially the negative of the first phase.

8. The method of claim 7, wherein:

the number of data signals is p, p being greater than or equal to three; and the number of control signals is $2^p/2$.

9. The method of claim 7, wherein each phase modulator PSK modulates the communication signal of the plurality of communication signals by:

modulating at a different pair of phases than the other phase modulators.

10. The method of claim 7, wherein repeating the following for each phase modulator of the plurality of phase modulators further comprises:

phase shifting at least a subset of the plurality of communication signals to yield different phases for the plurality of phase modulators.

11. The method of claim 7, wherein repeating the following for each phase modulator of the plurality of phase modulators further comprises:

coupling the plurality of modulated communication signals.

12. The method of claim 7, wherein repeating the following for each phase modulator of the plurality of phase modulators further comprises:

splitting one or more optical signals to yield the plurality of communication signals.

13. Logic operable to modulate a signal according to phase-shift keying (PSK) modulation, the logic embodied in a non-transitory computer-readable storage media and operable to:

receive a plurality of data signals;

translate the plurality of data signals into a plurality of control signals, the number of control signals greater than the number of data signals; and repeat the following for each phase modulator of a plurality of phase modulators:

receive a control signal of the plurality of control signals; and

PSK modulate a communication signal of a plurality of communication signals according to the received control signal by delaying a first phase and delaying a second phase that is substantially the negative of the first phase.

14. The logic of claim 13, wherein:

the number of data signals is p, p being greater than or equal to three; and the number of control signals is $2^P/2$.

15. The logic of claim 13, wherein each phase modulator PSK modulates the communication signal of the plurality of communication signals by:

modulating at a different pair of phases than the other phase modulators.

16. The logic of claim 13, further operable to repeat the following for each phase modulator of the plurality of phase modulators by:

phase shifting at least a subset of the plurality of communication signals to yield different phases for the plurality of phase modulators.

17. The logic of claim 13, further operable to repeat the following for each phase modulator of the plurality of phase modulators by:

coupling the plurality of modulated communication signals.

18. The logic of claim 13, further operable to repeat the following for each phase modulator of the plurality of phase modulators by:

splitting one or more optical signals to yield the plurality of communication signals.

19. A system operable to modulate a signal according to phase-shift keying (PSK) modulation, comprising:

means for receiving a plurality of data signals;

means for translating the plurality of data signals into a plurality of control signals, the number of control signals greater than the number of data signals; and means for repeating the following for each phase modulator of a plurality of phase modulators:

receiving a control signal of the plurality of control signals; and

PSK modulating a communication signal of a plurality of communication signals according to the received control signal by delaying a first phase and delaying a second phase that is substantially the negative of the first phase.

20. A system operable to modulate a signal according to phase-shift keying (PSK) modulation, comprising:

a translator operable to:

receive a plurality of data signals; and translate the plurality of data signals into a plurality of control signals, the number of control signals greater than the number of data signals, wherein:

the number of data signals is p, p being greater than or equal to three; and the number of control signals is $2^P/2$;

a plurality of splitters operable to split one or more optical signals to yield a plurality of communication signals; and a phase modulation system coupled to the translator and comprising:

a plurality of phase modulators, each phase modulator modulating at a different pair of phases than the other phase modulators, each phase modulator operable to:

receive a control signal of the plurality of control signals; and

PSK modulate a communication signal of the plurality of communication signals according to the received control signal; and each phase modulator comprising:

a phase delay operable to delay a first phase; and a negative phase delay operable to delay a second phase that is substantially the negative of the first phase;

a plurality of phase shifters operable to phase shift at least a subset of the plurality of communication signals to yield different phases for the plurality of phase modulators; and a plurality of couplers operable to couple the plurality of modulated communication signals.

* * * * *